Figure 7:
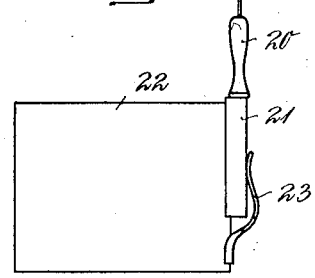

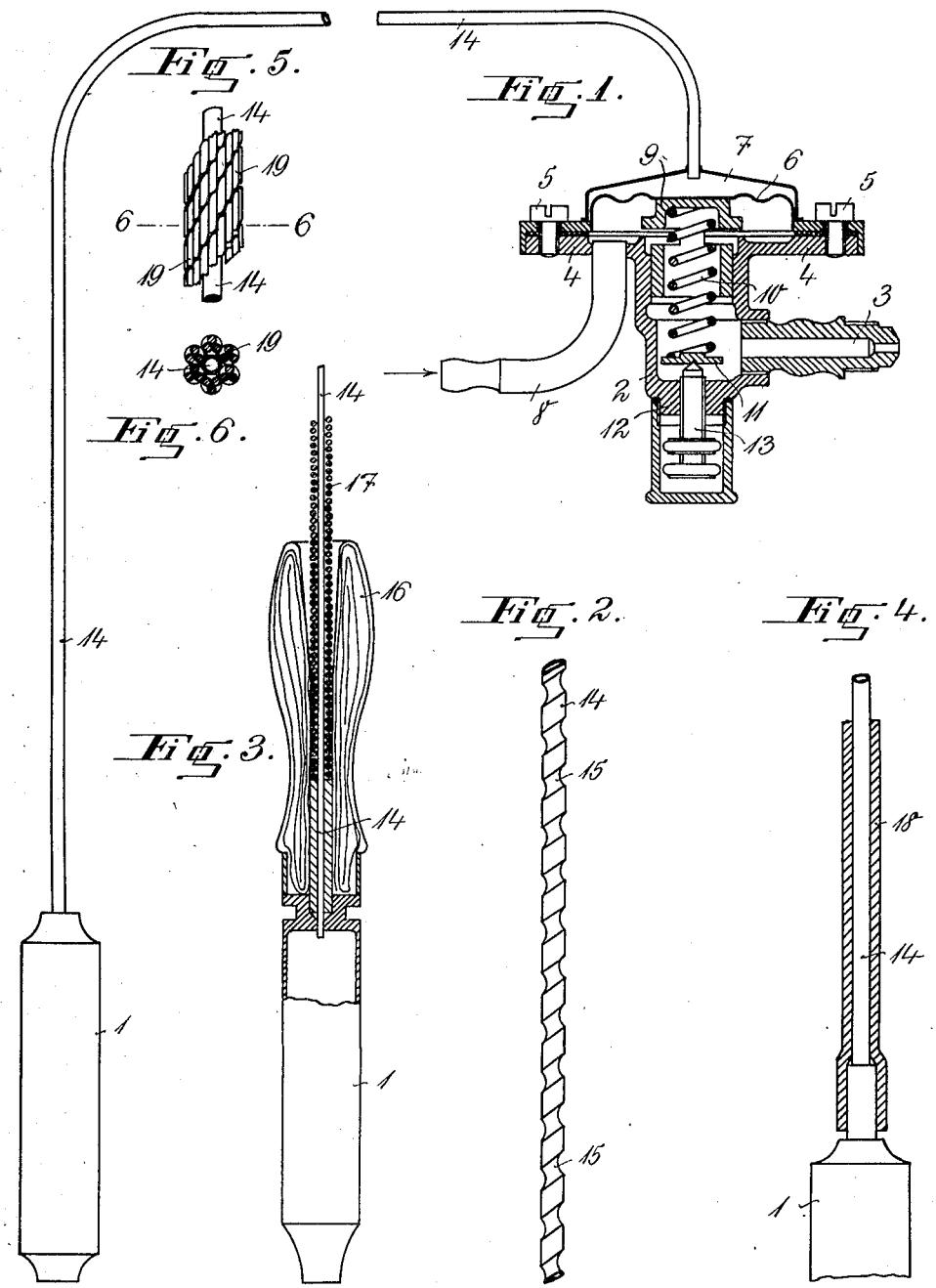

H. JUNKERS.
AUTOMATIC REGULATOR FOR GAS STOVES.
APPLICATION FILED MAR. 12, 1906.
926,194.
Patented June 29, 1909.
3 SHEETS—SHEET 2.
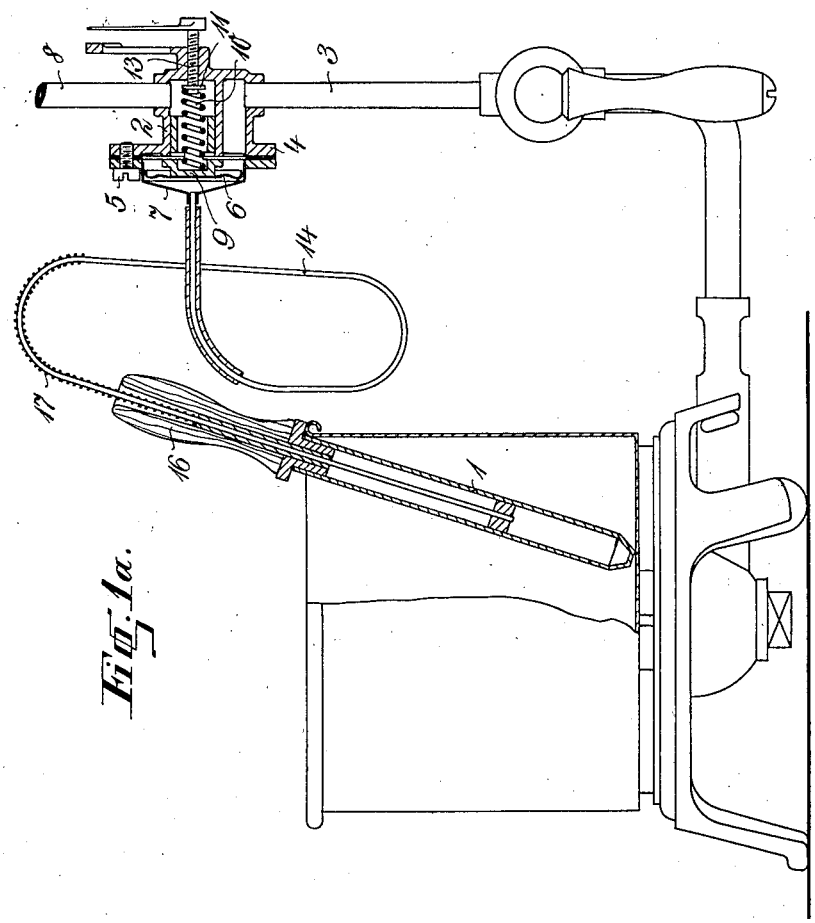

H. JUNKERS.
AUTOMATIC REGULATOR FOR GAS STOVES.
APPLICATION FILED MAR. 12, 1906.

926,194.

Patented June 29, 1909.

Witnesses.
E. O. Hildebrand
N. Reynolds

Inventor
Hugo Junkers
by his Attorneys
Georgii Massie

UNITED STATES PATENT OFFICE.

HUGO JUNKERS, OF AIX-LA-CHAPELLE, GERMANY.

AUTOMATIC REGULATOR FOR GAS-STOVES.

No. 926,194.    Specification of Letters Patent.    Patented June 29, 1909.

Application filed March 12, 1906. Serial No. 305,711.

*To all whom it may concern:*

Be it known that I, HUGO JUNKERS, a citizen of the German Empire, residing at Aix-la-Chapelle, Germany, have invented certain new and useful Improvements in Automatic Regulators for Gas-Stoves; and I do hereby declare the following to be a full, clear, and exact description of the invention, such as will enable others skilled in the art to which it appertains to make and use the same.

This invention relates to automatic regulators for gas stoves and has for its object the provision of means by which the supply of gas to the burner is automatically controlled by the temperature of the article being cooked thereby, and having the further object in view of accomplishing this result by a device simple in construction, effective in operation, and adapted for convenient use and general application.

The invention as hereinafter described and particularly pointed out in the claims will be readily understood by reference to the accompanying drawings, in which is represented a preferred embodiment of the invention, together with modifications.

In these drawings: Figure 1 is a side elevation of the device partially in section to show the internal construction; Fig. 1ª is a view of the device in operative relation to a cooking vessel and a burner; Fig. 1ᵇ is a detail section of the connection between the capsule and the flexible tube; Fig. 2 is an enlarged detail of one form of tubular connection; Fig. 3 is a modified detail of one form of capsule and connecting tube; Fig. 4 is a fragment of another form of connecting tube with its protective covering; Fig. 5 is a fragmentary view of one form of connecting tube with abraded covering; Fig. 6 is a cross section on the line 6—6 of Fig. 5; and Figs. 7 to 14 inclusive are views of different forms of cooking vessels adapted for use in connection with the device shown in the preceding figures.

The regulating device shown in Fig. 1 consists of a capsule 1 arranged to be filled with a suitable fluid sensitive to changes in temperature, such as ether, alcohol or the like, which capsule is to be brought into such relation with the cooking vessel or its contents as to be influenced thereby.

The valve casing 2 is provided with a tubular stud 3 leading to the gas burner, while above it is provided with a disk like flange 4 to which is secured by means of screws 5, a cap inclosing a diaphragm 6 and forming a chamber 7 divided by said diaphragm into two parts. Into the lower half of this chamber below the diaphragm leads the gas supply pipe 8. The entrance to the valve casing 2 is closed by the valve 9 in the form of a cover upon which rests the diaphragm 6, which valve is supported from below by the spiral spring 10 provided at its lower end with a plate 11. The lower wall 12 of the valve casing is perforated to receive the set screw 13 which bears with its upper end against the plate 11 whereby the tension of the spring 13 may be closely regulated.

The upper part of the chamber 7 above the diaphragm 6 is connected with the capsule 1 by means of a flexible metal tube 14, of from one thirty-secondth of an inch to one eighth inch in diameter.

The operation of the device is as follows. The capsule 1 is brought into such relation to the cooking vessel or pot that the temperature of the pot or its contents is transmitted to the contents of the capsule, causing an expansion of the fluid contents of the same corresponding to the temperature of the contents of the pot. The pressure due to this expansion is transmitted through the tube 14 and the diaphragm 6 to the valve 9, pressing the same downward and throttling to a greater or less degree the gas in its passage through the supply pipe 8, the valve casing 2, and the stud 3 to the burner. It follows that if the temperature of the cooking vessel and its contents is low, more gas will be supplied to the burner, while as the temperature of the cooking article increases, the supply of the gas to the burner will be gradually decreased, resulting in a sensitive and perfectly automatic regulation of the heat supplied to the cooking vessel by the burner.

In order to adapt the device for convenient and general use, it is important that the connection between the capsule 1 and the chamber 7 should be a very light and flexible one, while on the other hand, it should be of such a character as not to be easily injured in use. Having this point in view, the tube is preferably made of metal having a small diameter and its flexibility may be increased by forming it with spiral exterior grooves 15 as shown in Fig. 2.

To facilitate the handling of the capsule, it may advantageously be provided with a heat insulating handle 16 surrounding the tube 14 at or near its junction with the capsule 1 as shown in Fig. 3. In this view, the tube is shown as provided with a metal spiral 17 to prevent its injury without impairing its flexibility.

In Fig. 4, the metal spiral of Fig. 3 is substituted by a protecting shell 18 of woven wire, gum, asbestos or other suitable material.

In Figs. 5 and 6, the tube 14 is shown as surrounded by a woven shell of suitable material, such as fine metal wires or the like.

Ordinarily, the sensitive capsule 1 is made out of metal and the tube 14 is connected therewith by soldering. If the capsule 1 is made out of other material, the connection between it and the tube will be formed in a correspondingly suitable manner, as for instance, if it is of glass, the connection might be by a platinum tube melted into the glass wall of the capsule and soldered to the metal tube.

Figure 9:
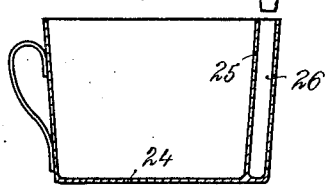
Figure 10:
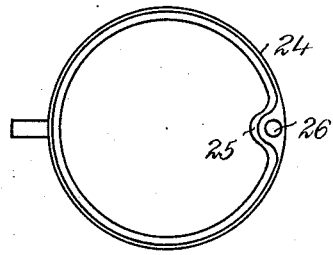

While the device so far described might be used by plunging the capsule 1 into the midst of the contents of the pot or other cooking vessel, in many cases this would be undesirable and it is found advantageous, therefore, to provide the vessel with a suitable arrangement by which an intimate contact may be effected between the vessel and the capsule and the temperature of the one transferred to the other without material variation. For this purpose, the capsule, provided with the handle 20, may be given a flattened form as shown at 21 in Fig. 7, hollowed out to snugly fit against the outer wall of the cooking vessel or pot 22, and may be held tightly against the wall of the vessel by means of a leaf spring 23. As an alternative means for securing this same result the pot 24 as shown in Figs. 9 and 10 may have its wall thickened at one point in the form of a rib 25, bored out at 26 to receive the capsule 28 provided with a hand grip 27.

Figure 11:
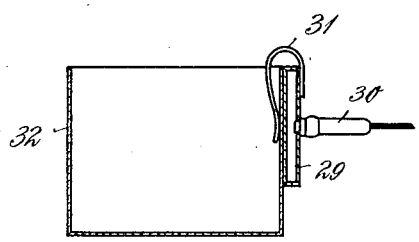
Figure 8:
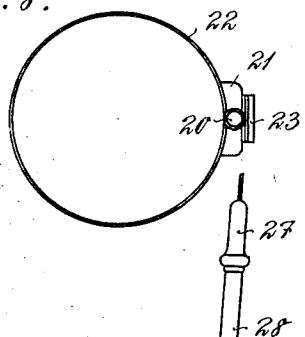

In Fig. 11, the capsule 29 flattened and hollowed out similar to that shown in Figs. 7 and 8, is provided with a laterally extending hand grip 30 and is held snugly against the outer wall of the pot by means of a spring 31 secured thereto and hooked over the upper edge of the pot.

Figure 12:
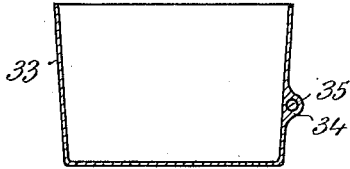

According to Fig. 12, the pot 33 is provided on its outer wall with a projection 34, bored out horizontally at 35 to receive a round capsule.

Figure 13:
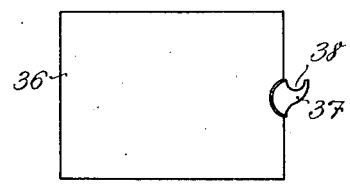

Fig. 13 shows a pot 36 provided upon its outer wall with a horn like projection 37 bearing in its upper face a rest 38 within which the capsule may rest.

Figure 14:

In Fig. 14 the pot 39 is provided with a laterally extending stud 40, over which may be shoved an annular capsule 41 having a laterally extending tubular connection 42 and provided with suitable heat insulating covering or jacket 43.

Obviously, the constructive details of the regulating device and the forms of cooking vessels with which the device might be used and the modified methods of adapting them for such use might be multiplied indefinitely without departing from the spirit of my invention as described and hereinafter claimed.

Having thus described my invention, what I claim as new and desire to secure by Letters Patent, is:

1. In an automatic regulator for controlling the temperature of a mass being cooked over a gas burner, the combination of a gas supply pipe, a valve casing therein, a valve controlling the flow through the casing, a pressure-transmitting device within the casing acting on the valve, a capsule containing heat-sensitive fluid, a flexible tube connecting the capsule with the pressure-transmitting device, and means for securing the capsule in intimate contact with the cooking vessel.

2. The combination with a heat sensitive capsule, a gas supply pipe having a regulating device, and a flexible connection between the capsule and the regulating device, of a cooking vessel, and means for securing the capsule in intimate contact therewith.

3. The combination with a heat sensitive capsule, a gas supply pipe having a regulating device, and a flexible connection between the capsule and the regulating device, of a cooking vessel having its wall arranged to conform closely to the outer contour of the capsule, and means for securing the two in intimate contact.

4. The combination with a heat sensitive capsule, a gas supply pipe having a regulating device, and a flexible connection between the capsule and the regulating device, of a cooking vessel having its wall arranged to conform closely to the outer contour of the capsule, means for securing the two in intimate contact, and means for protecting the capsule from extraneous influences.

5. The combination with the supply pipe of a gas burner and a valve arranged therein, of a diaphragm bearing upon said valve, a capsule containing a heat sensitive fluid and being movable independently from the gas supply pipe, and a connection between the interior of the capsule and a chamber formed on the opposite side of the diaphragm from the valve, a cooking vessel arranged to be heated by the burner, and means for securing the capsule in intimate contact with the vessel.

6. The combination with the supply pipe of a gas burner and a valve arranged therein, of a diaphragm bearing upon said valve, a capsule containing a heat sensitive fluid and being movable independently from the gas supply pipe, and a connection between the interior of the capsule and a chamber formed on the opposite side of the diaphragm from the valve, a cooking vessel having its wall arranged to conform closely to the contour of the capsule, and means for securing the two in intimate contact.

7. The combination with the supply pipe of a gas burner and a valve arranged therein, of a diaphragm bearing upon said valve, a capsule containing a heat sensitive fluid and being movable independently from the gas supply pipe, and a connection between the interior of the capsule and a chamber formed on the opposite side of the diaphragm from the valve, a cooking vessel having its wall arranged to conform snugly to the contour of the capsule, and means for insulating the capsule from extraneous influences of temperature.

8. The combination of a supply pipe with a gas burner, a valve casing arranged in said supply pipe, a valve controlling the passage through said casing, a spring tending to open said valve, a set screw for regulating the tension of said spring, of a diaphragm arranged within the valve casing and bearing upon the opposite side of the valve from the spring, a capsule arranged to contain a heat sensitive fluid, a flexible metallic tubular connection between the interior of the capsule and of the valve casing above the diaphragm, protecting covering for the flexible metallic tubular connection, and a non-conductor of heat forming a handle of the capsule, a cooking vessel having its wall arranged to conform closely to the outer contour of the capsule, and means for insulating the capsule from extraneous influences of temperature other than that of the cooking vessel.

9. The combination with the supply pipe of a gas burner and a valve arranged therein, of a diaphragm bearing upon said valve, a capsule containing a heat sensitive fluid, a flexible tubular connection between the interior of the capsule and a chamber formed on the opposite side of the diaphragm from the valve, and an insulating covering for the tubular connection.

10. The combination with the supply pipe of a gas burner and a valve arranged therein, of a diaphragm bearing upon said valve, a capsule containing a heat sensitive fluid, a helically grooved metallic tubular connection between the interior of the capsule and a chamber formed on the opposite side of the diaphragm from the valve, and an insulating covering for the tubular connection.

11. The combination of a supply pipe with a gas burner, a valve casing arranged in said supply pipe, a valve controlling the passage through said casing, a spring tending to open said valve, a set screw for regulating the tension of said spring, of a diaphragm arranged within the valve casing and bearing upon the opposite side of the valve from the spring, a capsule arranged to contain a heat sensitive fluid, a flexible metallic tubular connection between the interior of the capsule and of the valve casing above the diaphragm, an insulating covering for the flexible tubular connection, and a non-conductor of heat forming a handle of the capsule.

In testimony whereof I hereunto affix my signature in the presence of two witnesses.

HUGO JUNKERS.

Witnesses:
   WILLIAM J. REUTERS,
   SIBELLOR PORLMAN.